June 5, 1928.  
E. O. BENTSON  
RIDING ATTACHMENT FOR DRILLS  
Filed Jan. 6, 1927  
1,672,745  
2 Sheets-Sheet 2
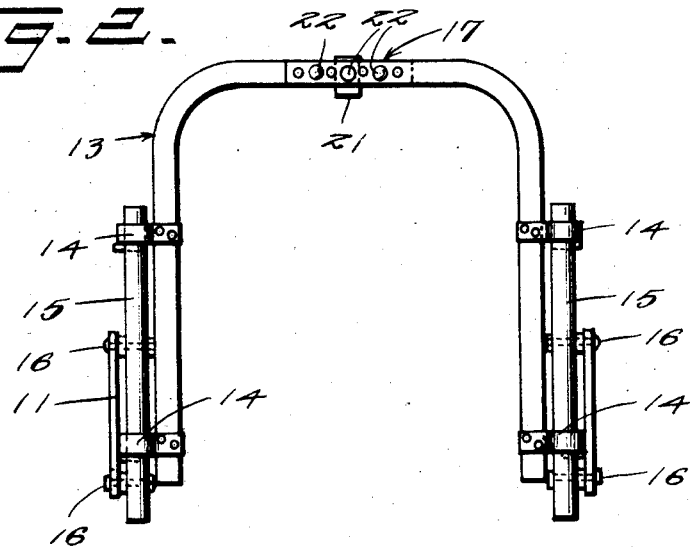
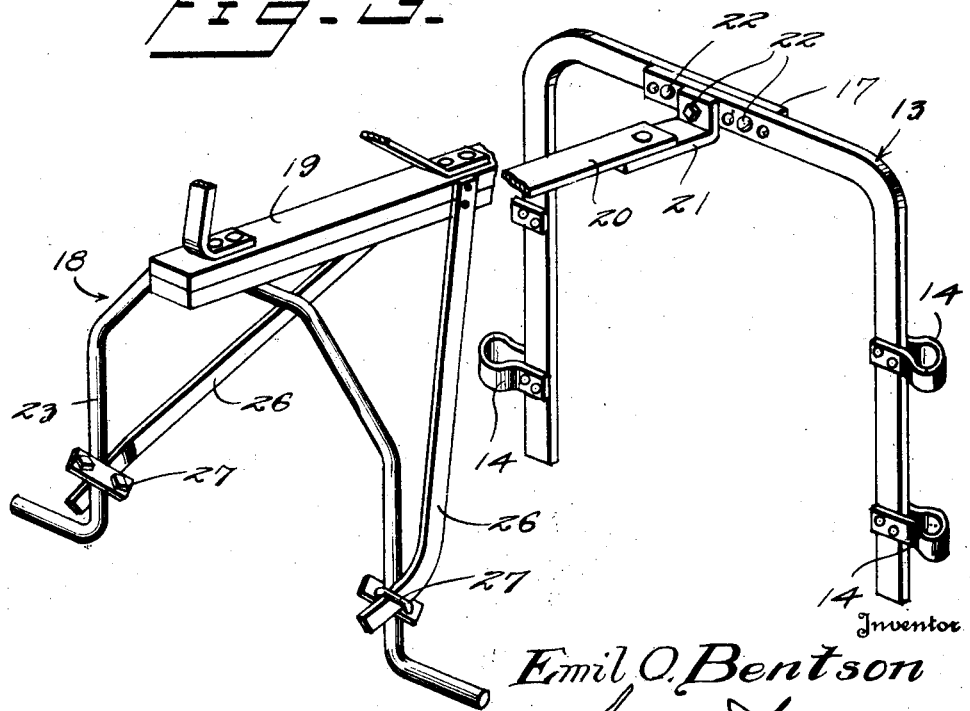
Inventor  
Emil O. Bentson Patented June 5, 1928.

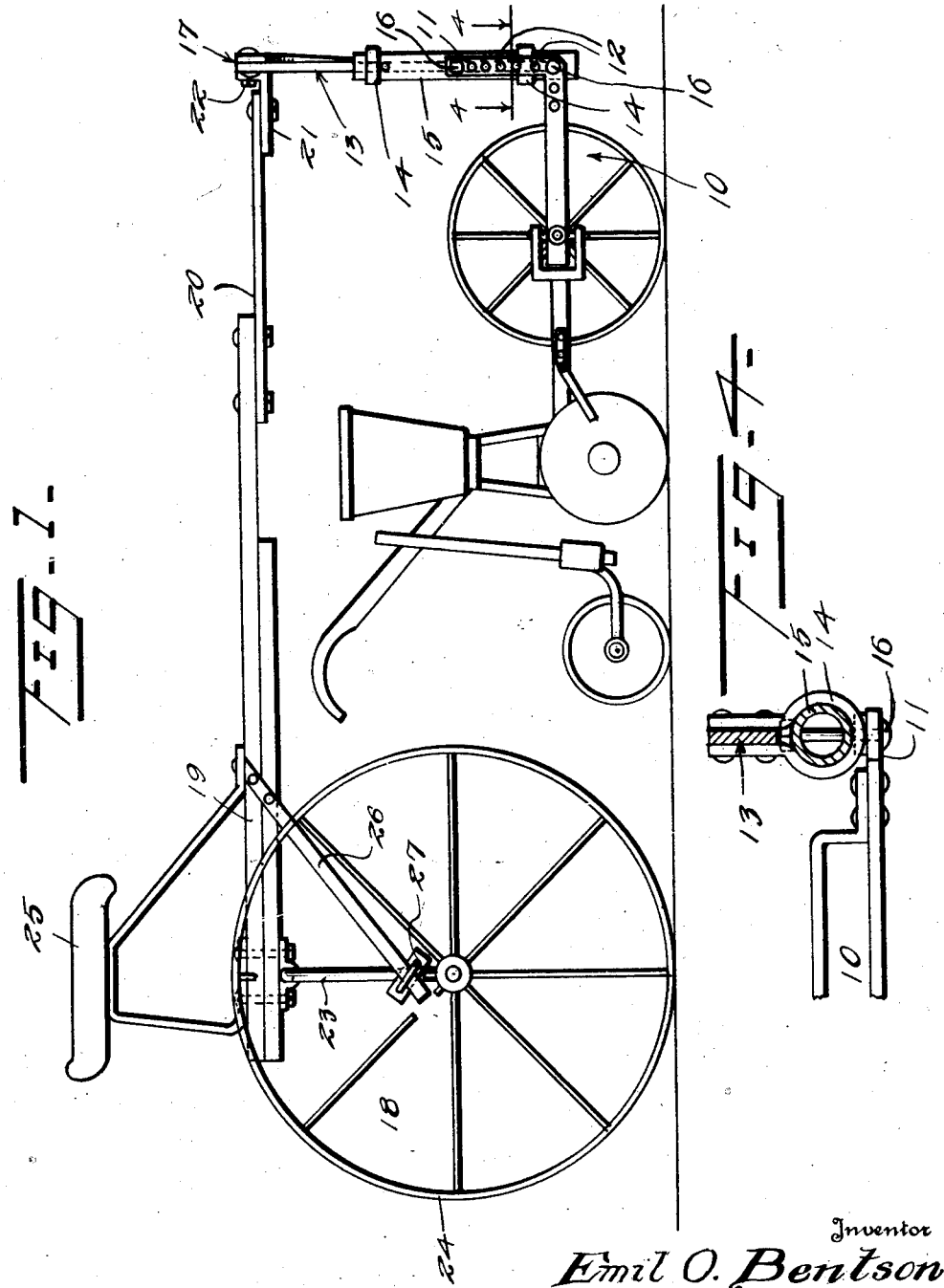

1,672,745

UNITED STATES PATENT OFFICE.

EMIL O. BENTSON, OF HAXTUN, COLORADO.

RIDING ATTACHMENT FOR DRILLS.

Application filed January 6, 1927. Serial No. 159,458.

This invention relates to new and useful improvements in riding attachments, and particularly to riding attachments for agricultural machines, such as drills, and the like.

One object of the invention is to provide a device of this character which can be easily and quickly attached to a drill, without modification to the drill.

Another object is to provide a device of this character which permits the driver to be seated in a comfortable position, with respect to the drill, and whereby he may have a clear view of the operations of the machine.

Other objects and advantages will be apparent from the following description when taken in connection with the accompanying drawing.

In the drawing:

Figure 1 is a side elevation of the riding attachment, and such portions of the drill as are necessary to the proper understanding of the attachment, and its use.

Figure 2 is a front elevation of the same.

Figure 3 is a perspective view of the riding attachment removed from the drill.

Figure 4 is a horizontal sectional view on the line 4—4 of Figure 1.

Referring particularly to the accompanying drawing, 10 represents the forward portion of the draft frame of a gang drill, which includes the vertical bars 11, each having the longitudinal series of openings 12. Disposed in vertical position, at the front of the drill, is a yoke 13, and carried by the lower portions of the arms of the yoke are the clips 14, vertical posts 15 being rotatably supported in said clips. Each of the posts has a pair of bolts 16 which are properly secured in certain openings of the beforementioned vertical bars 11. The yoke is preferably formed in two sections, bolted together at the bight portion, as indicated at 17, whereby the arms thereof may be adjusted toward and away from each other, for the purpose of accommodating the yoke to drills of different widths.

Disposed rearwardly of the drill is a two wheeled cart 18, which includes the forwardly extending tongue 19, said tongue terminating a short distance from the front of the drill. Secured to the tongue, and extending to the bight portion of the beforementioned yoke 13, is a metal bar 20, and secured to the forward end of said bar is an angle plate 21, one wing of which is connected with the bight of the yoke by means of one of the bolts 22, which hold the sections of the yoke together.

The cart 18 includes the arched axle 23, on the ends of which are mounted the ground wheels 24, and to the upper portion of which axle is secured the rear end of the tongue 19. A seat 25 is properly supported on the tongue, while braces 26 are secured to the sides of the tongue, and extend to the legs of the arched axle, where they are secured to said legs by means of the clamps 27.

The fact that the posts 15 are rotatable in the clips 14, provides for the proper tracking of the drill, when drawn forwardly, by animals or a tractor, hitched to said vertical bars 11.

It will be particularly noted that the cart is connected at a single point to the drill, and that is by means of the bar 20, which is connected to the forward yoke 13, so that the car will be free to swing laterally, as the machine proceeds forwardly.

What is claimed is:

A riding attachment for a drill comprising a yoke including a pair of inverted L-shaped sections, having their transverse portions connected for lateral adjustment, means on the arms of the yoke for pivotal connection with a drill, an arched axle spaced from the yoke and in a plane parallel therewith, the drill having a draft tongue, braces between the tongue and axle, and a flexible bar secured to the outer end of said tongue and pivotally connected with the yoke at the point of adjustable connection of said sections.

In testimony whereof, I affix my signature.

EMIL O. BENTSON.